United States Patent [19]
Glasser et al.

[11] 4,140,809
[45] * Feb. 20, 1979

[54] SOUP CONCENTRATES

[75] Inventors: George Glasser, Ossining; Ragnar E. Sjonvall, Eastchester, both of N.Y.

[73] Assignee: General Foods Corporation, White Plains, N.Y.

[*] Notice: The portion of the term of this patent subsequent to Jun. 11, 1989, has been disclaimed.

[21] Appl. No.: 767,710

[22] Filed: Feb. 11, 1977

Related U.S. Application Data

[63] Continuation of Ser. No. 655,314, Feb. 4, 1976, abandoned, which is a continuation of Ser. No. 43,569, Jun. 4, 1970, abandoned.

[51] Int. Cl.² ............................................. A23L 1/40
[52] U.S. Cl. ................................. 426/589; 426/532
[58] Field of Search ................. 426/589, 564, 532

[56] References Cited

U.S. PATENT DOCUMENTS

| 2,079,049 | 5/1937 | Allen | 426/589 |
|---|---|---|---|
| 2,357,585 | 7/1944 | Galvin | 426/589 |
| 3,111,408 | 11/1963 | Cheng | 426/564 |
| 3,516,838 | 6/1970 | Du Puis | 426/532 |
| 3,634,104 | 1/1972 | Kaplon | 426/589 |
| 3,676,154 | 7/1972 | Glasser | 426/589 |
| 3,694,233 | 9/1972 | Kaplon | 426/589 |

FOREIGN PATENT DOCUMENTS

| 675538 | 12/1903 | Canada | 426/589 |
|---|---|---|---|
| 1368669 | 6/1964 | France | 420/589 |
| 298733 | 11/1929 | Italy | 426/589 |
| 923 of | 1880 | United Kingdom | 426/589 |

Primary Examiner—Robert Halper
Attorney, Agent, or Firm—Daniel J. Donovan; Bruno P. Struzzi; Howard J. Newby

[57] ABSTRACT

A variety of soup concentrates, each containing meat or vegetable particulates, or both, is prepared with a water soluble solids content sufficient to prevent the soup concentrate from solidifying at home freezer temperatures (0° F. to 15° F.) and thereby effects a readily spoonable, semi-rigid consistency which lends itself to single serving dispensing and dilution with hot water to form an excellent quality soup.

2 Claims, No Drawings

SOUP CONCENTRATES

This is a continuation of application Ser. No. 655,314 now abandoned filed Feb. 4, 1976 which is a continuation of application Ser. No. 43,569, now abandoned, filed June 4, 1970.

BACKGROUND OF THE INVENTION

1. Field of the Invention

This invention is related to soups and soup concentrates. In particular, the invention is directed to a particulate-containing soup concentrate which, upon being packaged in a hermetically sealed pouch or other such sealed container, without the necessity of retorting, is transformed to a spoonable plastic physical state when stored for an extended time period at home freezer temperature conditions.

2. Description of the Prior Art

The outstanding disadvantage of conventional canned soups and soup concentrates is the degradation of the desirable delicate flavor and textural features of the natural vegetable and meat ingredients formulated in the soup mixture when the mixture is heat processed after canning to effect commercial sterilization. Many canned soups have a detectable off-flavor, usually characterized as a caramelized flavor, attributable to the prolonged, high temperature processing after canning whereof the soup content near the wall of the container is subjected to excessive heat incident to assuring the remaining content to be adequately processed.

Dehydrated soup mixtures, in addition to requiring boiling, or at least simmering, to reconstitute the dried particulates of the mixture to a soft textural state in a reasonable period of time, also have the flavor deficiencies generally associated with dehydrated vegetables and meats.

Frozen soups, wherein the liquid and particulates are converted to a rigid solid state during the processing of the comestibles, upon thawing and heating for consumption, are known to exhibit poor textural quality which is attributed to the inability of the soup ingredients, especially the cellular of fibrous particulates, to withstand freeze-thaw temperature cycle conditions.

The above-mentioned significant disadvantages manifested in conventional soups and dry soup mixes have been universally recognized and the prior art has long sought a means to provide a soup product which, in addition to being amenable to convenient, rapid preparation on the part of the housewife, would have the excellent flavor and textural qualities associated with freshly prepared "home-made" soups. The present invention is intended to satisfy such requirements.

Within the recent past, considerable knowledge has been gained concerning the relationship among the chemically bound water content, the water solute content, the water insoluble solids content and the free water of a food and the effect of this relationship on the capability of the food to resist complete solidification at depressed temperature conditions.

Within present knowledge, however, the prior art has not discovered how the principle of properly effecting the aforementioned relationship can be utilized to preserve the initial flavorable impact of a soup concentrate and the textural integrity of the cellular or fibrous food particles contained therein. Those efforts which involved the use of effective amounts of propylene glycol and other polyhydric alcohols have been less than successful because of the introduction of foreign and unpleasant flavor notes by these exoticingredients to the resulting food products.

SUMMARY OF THE INVENTION

It, therefore, becomes an object of the invention to provide a variety of soup concentrates, each of which contains structured meat and/or vegetable particulates which, after being maintained at freezer temperatures of about 0° F. to about 15° F. and than diluted with hot water to single-serving strength, will form a soup having excellent consumer flavor and texture appeal.

It is another object of the instant invention to provide soup concentrates which are easily and conveniently prepared for consumption.

It is still another object of the invention to provide a soup concentrate which, upon being hermetically packaged, and without further heat processing after packaging, is microbiologically stable at temperatures of about 0° F. to about 15° F. for extended periods of time.

It is yet another object of the present invention to provide a soup concentrate which, upon storage in freezer cabinets where ambient temperatures are in the approximate range of 0° F. to 15° F., will not solidify, but rather, will form an easily spoonable mass having a plastic-type consistency.

It is a feature of the invention that the soup concentrate can be packaged in multi-serving size quantities and, when chilled to home freezer temperatures may be easily spooned from the package in amounts sufficient for dilution with hot water to satisfy individual serving requirements.

It is another feature of the instant invention that, since no post packaging heating processing is required, the soup concentrate of the invention can be packaged in a relatively inexpensive container such as a rigid plastic cup-like container or a pliable plastic envelope.

Briefly, the above and additional objects and features of the invention are accomplished by formulating a mixture of soup ingredients which, in addition to affording excellent flavor and texture to the finished soup product, cooperate to prohibit solidification at temperatures in the neighborhood of about 0° F. to about 15° F. Each soup concentrate formulation according to the invention is structured to prevent the segregation of water in the form of large water ice crystals when the soup concentrate is chilled to below 15° F. Rather, the essential ingredients in each of the soup concentrate formulations of the invention cooperate in synergetic fashion to favor the maintenance of small ice crystal formations in a substantially uniformly dispersed state throughout a semi-rigid matrix of substantially non-aqueous material.

The invention is predicated on the discovery that a soup concentrate formulation can be compounded which functions to prevent physical separation of the water content from the remaining material when the soup concentrate is chilled below water freezing temperatures to the degree that the water does not form large segregated ice masses. Importantly, this function is effected with conventional food ingredients which also serve to provide a finished soup product with excellent organoleptic features.

The structured meat and vegetable particulates which form the inlays of the concentrates and soups prepared therefrom, retain their freshly prepared texture and turgor since they are never subjected to a rigid frozen state and then thawed as with a conventional frozen soup. Rather, the high content of water soluble solids infuses along with the aqueous medium into the particulate and prevents the structured meat or vegetable inlay from forming a rigid solid thereby eliminating the attributable cause for cellular breakdown and the resulting "mushy" and otherwise unsatisfactory mouthfeel effects associated with meat, fish and vegetables which have been thawed from a rigidly frozen state.

The essence of the invention resides in the discovery that conventional soup ingredients which are water soluble and those which are water insoluble when, combined with a limited amount of water in correct proportions, will cooperate to:

1. prevent the concentrate from rigidly freezing when subjected to a temperature of about 0° F. to about 15° F., thereby preventing undue cellular disruption of the prepared food particulates therein, and 2. provide excellent flavor and textural components such that when the concentrate is diluted with approximately 3 to 10 parts of boiling water (depending on individual preference and concentrate blend) a high quality soup beverage is prepared.

DESCRIPTION OF THE PREFERRED EMBODIMENTS

The water soluble solids incorporated in the soup concentrates of the instant invention enhance the flavor and inhibit the freezing (solidification) of the mixture. For such two-fold purposes, salt (sodium chloride) mono or di-saccharides and monosodium glutamate are the three basic ingredients employed in proper proportional amounts and combined total quantity in each of the varieties of soup concentrates of the invention. In addition, hydrolyzed vegetable protein is used in the meat flavored concentrates to augment the effects of the three basic ingredients. In addition to enhancing the flavor, the water soluble solids constituents, in combination, will cooperate with the water insoluble materials and the free water to inhibit the soup concentrates from solidifying at freezer temperatures ranging from about 0° F. to about 15° F.

The water insoluble materials included in the soup concentrates of the invention are of three general types — structured particles or pieces, powders or fine granules, and fats or oils. In those varieties of concentrates admitting of either or both vegetables and meat inlays, cooked, but not over heat processed particulates are incorporated therein.

The expression "structured" is intended herein to designate that class of meats and vegetables which have retained their characteristic cell tissue structure, although some reduction in size, as by slicing or dicing, has occurred and to distinguish from mashed or powdered foods lacking in cellular structure.

Such cooked vegetable and meat pieces as mushroom slices, chicken pieces, beef pieces, corn, peas, etc. are incorporated in judicious quantities into the mixture. Generally, these ingredients make up about 3.0 to about 30 weight percent of the total weight of the concentrate. The variation in weight of the particles depends primarily on the type or variety of concentrate being formulated.

The food powders serve to enhance the flavor and/or texture of each soup concentrate and, for this purpose, such ingredients as garlic, pepper, celery seed, onion, and potato starch are used. As with the particulates or pieces, major variations in amounts and kinds of food flavor enhancing powders are employed; the choice being primarily determined by the particular varieties of soup concentrates being formulated.

In accordance with the invention other water insoluble ingredients are employed in the soup concentrate formulations to provide flavor and texture appeal. Hydrogenated cottonseed oil, butter oil and rendered beef fat are among these types of ingredients used to good advantage.

Understandably, there is wide latitude with respect to what the actual ingredients are in each of the soup concentrate formulations since many flavor or type varieties of the physical embodiments of the invention can be formulated. However, it is essential that each soup concentrate of this invention be formulated with water solutes and water insoluble solids to the extent that the ratio of solute to insoluble solids ranges from about 2:1 to about 0.25:1. The soup concentrates, in order to fall within the province of the invention, have a total moisture content ranging from about 40% to about 60%; water solutes ranging from about 20% to about 40%; and water insoluble materials ranging from about 10% to about 40%; based on the weight of the concentrate.

The soup concentrates of the invention are hygroscopic and it is, therefore, essential that they be packaged in hermetically sealed containers. Inexpensive plastic envelopes are suitable for such purpose.

The following examples illustrate in detail the various facets of the invention. It should be understood, however, that these examples are meant to be illustrative and the invention is not to be limited thereto.

EXAMPLE 1

BEEF CONCENTRATE WITH MEAT INLAYS

1. FORMULATION

| INGREDIENTS | GRAMS/ BATCH | PERCENT BY WEIGHT |
| --- | --- | --- |
| Salt | 8.2 | 8.7 |
| Sucrose | 2.9 | 3.1 |
| Hydrolyzed Vegetable Protein (Containing 15% Monosodium Glutamate & 40% NaCl.) | 8.2 | 8.7 |
| Pregelatinized Potato Starch | 2.0 | 2.2 |
| Lecithenated Hydrogenated Cottonseed Oil | 5.0 | 5.3 |
| Glucose Monohydrate | 5.8 | 6.1 |
| Monosodium Glutamate | 0.8 | 0.9 |
| Beef Extract | 0.7 | 0.7 |
| Caramel Color | 0.8 | 0.9 |
| Cooked Chuck (Beef) | 8.3 | 8.8 |
| Onion Powder (1) | 0.3 | 0.3 |
| Celery Seed Powder | 0.1 | 0.1 |
| White Pepper Powder | 0.1 | 0.1 |
| Garlic Powder | 0.1 | 0.1 |
| Added Water | 50.8 | 54.0 |
| | 94.1 | 100.00 |

(1) Powdered onion can be raw or toasted depending on whether a fresh or cooked flavor is desired.

2. PREPARATION (1) The chuck was cut into cubes varying in size from about ⅜" to about ½" and boiled for 8 minutes in an excess of water. The water was then decanted through a strainer and the formula weight of cooked chuck weighed out.

(2) All of the ingredients per the formulation (except the cooked chuck, beef extract, and cottonseed oil) were dry blended for 5 minutes at speed setting No. 1 in a one quart Hobart mixer fitted with a paddle.

(3) The beef extract and cottonseed oil were combined and melted in a double boiler and then added to the dry blend of (2) and blended for 5 minutes at speed setting No. 1.

(4) The formula weight of cooked chuck was folded into the above blend, and 200 mls of water was added to the batch.

(5) The mixture of (4) had a moisture content of 59.3% and, after being worked into a heavy paste, was packaged in a hermetically sealed plastic pouch and stored in a freezer cabinet at about 0° F. to 15° F.

3. RECIPE

Spoon from the package approximately 27 grams of soup concentrate and add it to about 180 mls of boiling water and stir until uniformly diluted and mixed, then serve.

EXAMPLE II

VEGETABLE SOUP CONCENTRATE

1. FORMULATION

| INGREDIENTS | GRAMS/ BATCH | WEIGHT PERCENT |
| --- | --- | --- |
| Salt | 7.0 | 7.5 |
| Monosodium Glutamate | 0.4 | 0.4 |
| Glucose Monohydrate | 8.0 | 8.6 |
| Hydrolyzed Vegetable Protein | 1.15 | 1.2 |
| Pregelatinized Potato Starch | 2.4 | 2.6 |
| White Pepper Powder | Trace | — |
| Onion Powder | Trace | — |
| Cooked Vegetables | 42.0 | 44.2 |
| Cooked Barley | 9.3 | 9.9 |
| Polyunsaturated Vegetable Oil (Mixture of Soybean and Cottonseed Oils- "Wesson" Oil) | 7.4 | 7.9 |
| Cooked Vegetable Paste (1) | 12.0 | 12.8 |
| Sucrose | 4.0 | 4.9 |
| | 93.7 | 100.0% |

(1) A blend of 28.3% tomato paste (30% solids), 34.7% pea paste (18.5% solids) and 37.0% carrot paste (8.8% solids) cooked and pureed.

2. PREPARATION (1) The salt, sugar, monosodium glutamate, glucose monohydrate, starch and spices were dry-blended in a Hobart mixer bowl as in Example I.

(2) The remaining ingredients were added in the following order — vegetable oil, vegetable paste, cooked barley and cooked vegetables. These ingredients, with the exception of the cooked vegetables were blended for 5 minutes at a speed setting of No. 1. The cooked vegetables were folded in by hand blending.

(3) The mixture of (2) had a moisture content of 48% and was packaged in a hermetically sealed plastic pouch and then stored in a freezer cabinet at about 0° F. to 15° F.

3. RECIPE

Spoon approximately 40 grams of concentrate from the package and add it to 125 mls of boiling water and stir until uniformly diluted and mixed, then serve.

EXAMPLE III

CREAM OF MUSHROOM SOUP CONCENTRATE

1. FORMULATION

| INGREDIENTS | GRAMS/ BATCH | PERCENT BY WEIGHT |
| --- | --- | --- |
| Mushroom Paste (1) | 18.8 | 19.8 |
| Non-Fat Milk Solids | 15.0 | 16.8 |
| Mushroom Slices (2) | 10.8 | 10.4 |
| Pregelatinized Potato Starch | 4.2 | 4.4 |
| Butter Oil | 3.1 | 3.3 |
| Salt | 9.0 | 8.5 |
| Sugar | 4.5 | 5.8 |
| Glucose Monohydrate | 8.5 | 8.9 |
| Monosodium Glutamate | 0.4 | 0.4 |
| Black Pepper Powder | Trace | — |
| Mace | Trace | — |
| Nutmeg | Trace | — |
| Thyme | Trace | — |
| Ground Bay Leaf | Trace | — |
| Added Water | 20.6 | 21.7 |
| | 94.9 | 100.0 |

(1) Sliced fresh mushrooms were immersed in lemon juice diluted with water (to minimize darkening) and cooked for 10 minutes at 15 psig. in a pressure cooker. The cooked mushrooms were then pureed.
(2) About ½" × ½" × ⅛" thick.

2. PREPARATION (1) The salt, spices, sugar and non-fat milk solids were blended with the butter oil for 5 minutes in a Hobart mixer fitted with a paddle at speed No. 1.

(2) The pureed mushrooms were added to the blend of (1) and blended for 5 minutes at speed setting No. 1.

(3) The mushroom pieces were then folded in by hand.

(4) The mixture of (3) had a moisture content of 48.7% and was packaged in a hermetically sealed plastic pouch and then stored in a freezer cabinet at about 0° F. to 10° F.

3. RECIPE

Spoon approximately 40 grams of frozen concentrate from the package and add it to 170 mls of boiling water. Stir until uniformly diluted and mixed, then serve.

In summary, the invention comprehends a variety of soup concentrates, each of which contains structured particulates of meat or vegetables, or both distributed throughout an aqueous mixture of conventional soup ingredients, such as oils, spices and sugars. Each of the soup concentrates is formulated with sufficient water solutes, in relation to the water insoluble materials and water present in the formulation, to prevent the concentrate from solidifying into a rigid block at temperature ranging from 0° F. to 15° F. The water solutes not only prevent the water from separating from the matrix ingredients as large segregated ice masses when the concentrate is subjected to temperature of 0° F. to 15° F., but also, by being infused within the particulates, prevent the particulates from rigidly solidifying. Surprisingly, each of the soup concentrates of the invention is converted to a readily spoonable plastic mass at temperatures of about 0° F. to 15° F. and this desirable consistency is brought about with the use of conventional food ingredients and without the need to resort to such exotic aqueous solutes as polyhydric alcohols.

Therefore, when each of the soup concentrates is spooned from its container and diluted with hot water, it is converted to a soup having excellent flavor and containing particulates which, having never been subjected to undue cellular rupture, exhibit excellent textural quantities.

While the invention has been illustrated by reference to specific embodiments, there is no intent to limit the spirit or scope of the invention to the precise details so set forth, except as defined in the following claims.

Having described what is new and desired to be secured by Letters Patent, we claim:

1. A spoonable, plastic type, soup concentrate comprising
    (a) water soluble solids selected from the group consisting of sodium chloride, saccharides, non-fat milk solids, monosodium glutamate, hydrolyzed vegetable protein and mixtures thereof in an amount from about 20 to about 40 weight percent based on the weight of the concentrate,
    (b) water insoluble food material including cooked vegetable and/or cooked meat particulates, fat and food flavor enhancers in combination in an amount ranging from about 10 to about 40 weight percent based on the weight of the soup concentrate, and
    (c) a total water content including free water and the water incorporated in the solids ranging from about 40 to about 60 weight percent based on the weight of the soup concentrate, whereby the soup concentrate has a plastic consistency at a temperature ranging from about 0° F. to about 15° F.

2. The soup concentrate of claim 1 wherein the water-soluble saccharides are selected from the group consisting of monosaccharides, sucrose and mixtures thereof.

* * * * *